(12) United States Patent
Wild et al.

(10) Patent No.: US 7,958,924 B2
(45) Date of Patent: Jun. 14, 2011

(54) APPARATUS AND METHOD FOR PRODUCING A WELD SEAM

(75) Inventors: Hans-Peter Wild, Eppelheim (DE); Eberhard Kraft, Neckarbischofsheim (DE)

(73) Assignee: INDAG Gesellschaft für Industrisbedarf mbH & Co. Betriebs KG, Eppelheim (DE)

( * ) Notice: Subject to any disclaimer, the term of this patent is extended or adjusted under 35 U.S.C. 154(b) by 1079 days.

(21) Appl. No.: 11/490,401

(22) Filed: Jul. 19, 2006

(65) Prior Publication Data

US 2007/0017623 A1 Jan. 25, 2007

(30) Foreign Application Priority Data

Jul. 20, 2005 (EP) ..................................... 05015798

(51) Int. Cl.
*B32B 37/00* (2006.01)
(52) U.S. Cl. .................. 156/580.2; 156/553; 156/580.1; 493/209
(58) Field of Classification Search .................. 156/73.1, 156/292, 308.2, 308.4, 553, 580.1, 580.2; 493/189, 203, 209, 239
See application file for complete search history.

(56) References Cited

U.S. PATENT DOCUMENTS

| | | | |
|---|---|---|---|
| 4,251,303 A | 2/1981 | Deimel et al. | |
| 4,534,818 A | 8/1985 | Kreager et al. | |
| 4,734,142 A * | 3/1988 | Creswell ...................... | 156/73.1 |
| 6,390,168 B1 | 5/2002 | Struve | |
| 6,482,291 B1 * | 11/2002 | Kume et al. ................. | 156/580.2 |
| 6,749,703 B2 * | 6/2004 | Iwashita et al. ................. | 156/64 |
| 2003/0152297 A1 | 8/2003 | Yasuhira | |

FOREIGN PATENT DOCUMENTS

| | | |
|---|---|---|
| DE | 1604580 | 11/1970 |
| EP | 1 066 951 A2 | 1/2001 |
| EP | 1088760 A2 | 4/2001 |
| EP | 1 127 794 A2 | 8/2001 |
| FR | 2 829 962 | 3/2003 |
| GB | 1120881 | 7/1968 |
| JP | 56058822 | 5/1981 |

OTHER PUBLICATIONS

International Search Report No. EP 05 01 5798 dated Nov. 29, 2005.

* cited by examiner

*Primary Examiner* — James Sells
(74) *Attorney, Agent, or Firm* — Stroock & Stroock & Lavan LLP

(57) ABSTRACT

The invention relates to an apparatus for producing a weld seam on a foil bag with an ultrasonic hammer and an anvil, preferably with a weld side directed towards the ultrasonic hammer, the weld side having a long projection, so that the foil material of the foil bag can be clamped between the projection and the ultrasonic hammer. Preferably, the projection has at least one depression running parallel to the projection. The invention furthermore relates to an apparatus for producing weld seams on foil bags, wherein more than one of the above apparatuses are arranged next to one another and can be activated synchronously. The invention furthermore relates to a method for producing a weld seam on a foil bag, wherein the foil bag is clamped between an ultrasonic hammer and an anvil, wherein the anvil has a long projection on a weld side directed towards the ultrasonic hammer, and the foil bag is provided with a weld seam by means of an ultrasound, wherein the projection has at least one depression running parallel to the weld seam. The invention also relates to a foil bag with a weld seam, wherein the weld seam has at least two weld zones and at least three or four sealing wedges.

16 Claims, 2 Drawing Sheets

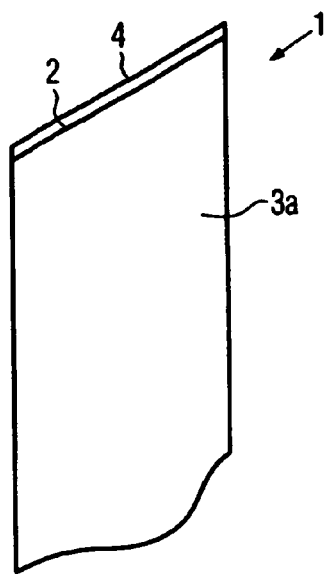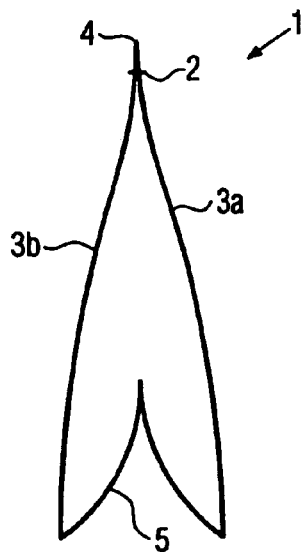
FIG. 1a
FIG. 1b
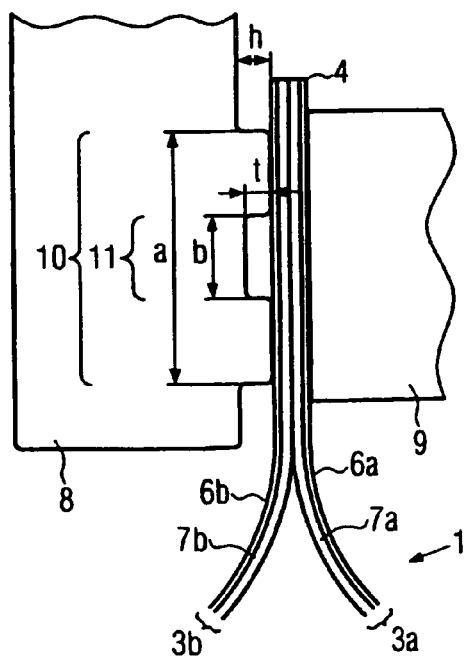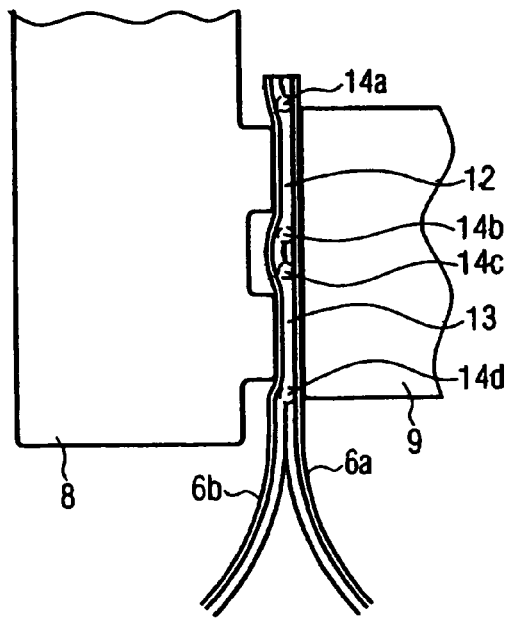
FIG. 2a
FIG. 2b

APPARATUS AND METHOD FOR PRODUCING A WELD SEAM

TECHNICAL FIELD OF THE INVENTION

The invention relates to an apparatus and a method for producing a weld seam on a foil bag, as well as a foil bag having one or more weld seams.

BACKGROUND OF THE INVENTION

Foil bags are commonly used as packaging for liquids or pasty masses. For example, drinks, animal foods, creams, dyes, soaps, etc. are often packaged in foil bags. Foil bags of this kind can, for example, have three sheets of foil: two side foil sheets and a bottom foil sheet.

One known way of forming a foil bag is welding pieces of foil together at the respective edges. This can be accomplished with a hot sealing method or using ultrasonic sealing.

One common drawback of the foil bags known in the art is that the weld seams occasionally have relatively small, but undesired leaks.

One object of the invention is to create an apparatus and a method for producing a weld seam on a foil bag, as well as a foil bag itself, having improved weld seams.

SUMMARY OF THE INVENTION

Generally speaking, the invention is directed toward an apparatus and method for forming weld seams on a foil bag, and the foil bag resulting therefrom. In accordance with one embodiment of the invention, the apparatus includes an ultrasound source and a press. The ultrasound source can be independent from or a part of the press. In accordance with one embodiment of the invention, the press includes an ultrasound source comprising an ultrasonic hammer and a corresponding anvil. Ultrasonic waves can be discharged into the foil material with the ultrasonic hammer, allowing the foil material to melt proximate the ultrasonic hammer. Preferably, the foil material is clamped between the ultrasonic hammer and an anvil, which preferably improves the efficiency at which the ultrasonic waves are injected from the ultrasound source into the foil.

In accordance with one embodiment of the invention, the anvil has a projection to clamp the foil bag between the projection and the ultrasonic hammer. The anvil can also include a depression, such as a groove, running parallel to the projection and preferably the weld seam.

The foil material preferably melts proximate the projection from the effect of the ultrasound and is pressed out of this area as a result of the pressure between the ultrasonic hammer and the anvil. As a result, sealing wedges of the melted material can form on the edges of the anvil, gluing the unmelted material together and sealing the weld seam.

A weld seam with four such sealing wedges can be created by proper arrangement of the depression in the projection, with these sealing wedges consequently leading to a particularly good and secure seal effect.

The two sealing wedges that form on the edges of the depression can also form together in the area of the depression, so that one single sealing wedge, or rather a sealing zone, can be created, thus providing a total of three sealing wedges.

In order to prevent the melted foil material that flows into the area of the depression from forming an undesirably large bulge, and in order to facilitate the melted foil material that flows into the area of the depression to be brought into contact with the unmelted foil material as the result of additional pressure, it is advantageous for the depression to have a smaller depth in comparison to the height of the projection.

In accordance with an embodiment of the invention, the depression has a width of about 10% to 90% of the width of the projection, preferably about 25% to 50%, more preferably about 30% to 35%.

The anvil is preferably not rigidly mounted, but instead mounted in a way such that it can tilt. In this case, tilting around at least 2 axes is advantageous. The axes do not have to run through the anvil itself (which is also possible), but can instead also run outside the anvil.

The anvil is advantageously mounted in such a way that it is urged toward the ultrasonic hammer, wherein this is preferably accomplished by means of 2 pressure elements, such as springs, rubber elements or the like.

As a result of these mountings and initial tensions, it may be possible to ensure uniform pressure along the weld seam that is to be formed between the anvil and the ultrasonic hammer. This is advantageous for the formation of a uniform weld seam along the length of the weld seam.

For good alignment of the anvil, it can be advantageous to provide two pressure elements to apply a pressure proximate the ends of the anvil.

For further increasing the reliability of the seal of the weld seam, it is also possible to provide more than one depression (groove), wherein these depressions preferably run parallel to one another. This may provide a plurality of sealing wedges, for example, more than four sealing wedges, which can improve the sealing effect.

In accordance with an embodiment of the invention, a system comprising a plurality of apparatuses aligned can simultaneously create weld seams on multiple foil bags, which can provide high throughput rates at the same clock speed and minimum design effort. For example, various mechanical devices can be commonly used in various welding devices.

The invention is also directed to a method of producing a weld in a foil bag, for example, by clamping a part of a foil bag between a projection on an anvil and an ultrasonic hammer, and providing ultrasound and requisite pressure, the projection of the anvil preferably having at least one depression.

The invention is also directed to a foil bag having a weld seam that has at least two weld zones and at least three or four sealing wedges.

Other objects and features of the present invention will become apparent from the following detailed description, considered in conjunction with the accompanying drawing figures. It is to be understood, however, that the drawings are designed solely for the purpose of illustration and not as a definition of the limits of the invention, for which reference should be made to the appended claims.

BRIEF DESCRIPTION OF THE INVENTION

For a fuller understanding of the invention, reference is had to the following description, taken in connection with the accompanying drawings, in which:

FIG. 1a is a perspective view of a foil bag in accordance with an embodiment of the invention;

FIG. 1b is a side view of the foil bag of FIG. 1a;

FIG. 2 is a sectional drawings of an apparatus in accordance with an embodiment of the invention and a foil bag;

FIG. 2b is a sectional drawings of an apparatus in accordance with an embodiment of the invention and a foil bag;

DETAILED DESCRIPTION OF PREFERRED EMBODIMENTS

Figure 3:
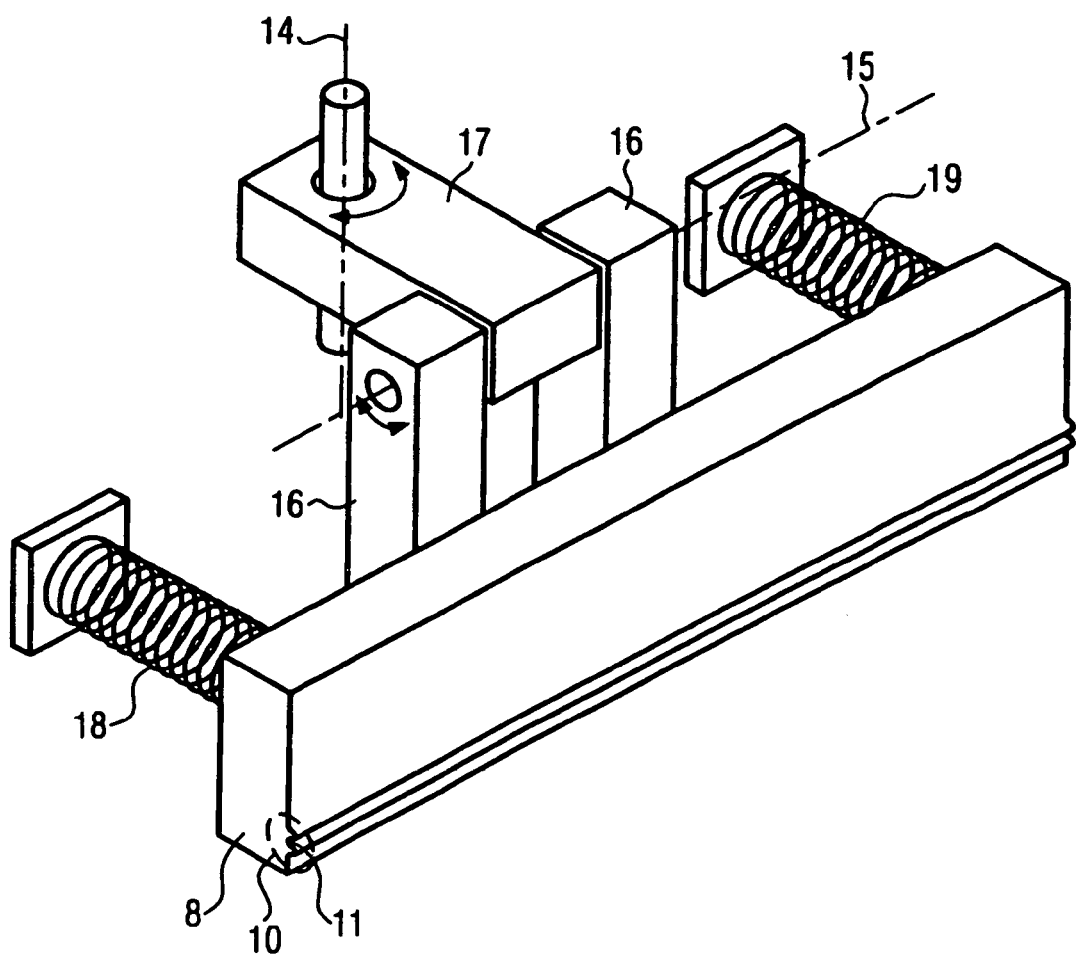
FIG. 3 is a perspective view of an anvil in accordance with one embodiment of the invention.

FIG. 1a shows a three-dimensional, schematic depiction of an embodiment of foil bag 1. FIG. 1b shows a side view of the same foil bag. The foil bag 1 has two side foil sheets 3a and 3b, as well as a bottom foil sheet 5. The bottom foil sheet 5 shown is folded, but it is to be understood that it can be flat, have multiple folds, etc. without deviating from the scope of the invention. Bottom foil sheet 5 is welded to the edges of the side foil sheets 3a and 3b at the lower ends. The side foil sheets 3a and 3b are welded together at the side edges of the foil bag 1. These weldings of the side foil sheets 3a, 3b to the side edges and the weldings to the bottom foil sheet 5 can be produced by means of thermal welding, as well as by means of ultrasonic sealing described herein.

The foil bags 1 can be manufactured in such a way that they are open at an upper end 4. The manufactured foil bags 1 can thereafter be filled through the upper end 4 and, after being filled, closed by creating a weld seam 2 at the open end thereof, for example, the top end, as illustrated in FIGS. 1a and 1b.

Sealing problems can occur when welding the upper end 4 after filling the foil bag 1, for example, because of impurities on the inner side of the bag that can prevent a tight weld seam. The apparatus and the method described in the following can be particularly advantageous for forming weld seam 2 at upper end 4, but is not limited thereto, and can also be used for creating other weld seams.

FIG. 2a shows an embodiment of the invention wherein the upper end 4 of a foil bag 1 is opened and is to be sealed. The two side foil sheets 3a and 3b run together in area 4. The side foil sheets 3a and 3b shown here consist of at least 2 layers: 6a, 7a and 6b, 7b, respectively. The layer 6a, 6b can further comprise various layers. For example, it can comprise an aluminum foil and a not readily weldable plastic. The layer 6a, 6b can also comprise a decorative pattern that is visible from outside.

The layer 7a, 7b are preferably manufactured from a material that can be welded, such as polyethylene. The layers 7a, 7b of the side foil sheets 3a, 3b are preferably in direct contact with each other at the upper end 4, but initially are not permanently joined together. The FIG. 2a shows the situation before ultrasound is injected.

In accordance with an embodiment shown in FIGS. 2a and 2b, the upper end 4 of the foil bag 1 is shown clamped in a press comprising an anvil 8 and an ultrasonic hammer 9, wherein the ultrasonic hammer 9 is also an ultrasound source constructed and arranged to inject ultrasonic waves into the material of the foil bag 1. It is to be understood that whereas the ultrasound source forms a part of the press in the embodiment illustrated and discussed herein, the ultrasound source can be an external element independent from the press without deviating from the scope of the invention as a matter of application specific to design choice. As shown, the anvil 8 preferably has a projection 10, which contact with the upper end 4 of the foil bag 1. The anvil 8 and the ultrasonic hammer 9 can be moved away from each other and toward each other, for example, by the linear movement and/or swiveling of either the anvil 8, the ultrasonic hammer 9 or both. Preferably, the anvil 8 and ultrasonic hammer 9 are moved apart to permit portions of the foil sheets therebetween, and are urged toward each other to deform and seal the foil sheets together. For example, anvil 8 can be urged toward the ultrasonic hammer 9 or the ultrasonic hammer 9 can be urged toward the anvil 8, thus clamping the portions of the foil sheets positioned between the anvil 8 and ultrasonic hammer 9 and applying pressure while applying ultrasound to melt the foil material of the clamped portions of the foil sheets.

One embodiment of the ultrasonic hammer 9 is connected to an ultrasound source, and ultrasonic hammer 9 can inject ultrasonic waves into the material of the foil bag 1. Preferably, a greater pressure is provided between the ultrasonic hammer 9 and the projection 10, thus increasing the effectiveness of the ultrasonic waves on the foil material proximate the projection 10, thus better sealing foil bag 1 proximate the projection 10.

As shown, projection 10 has a width a and a height h. A depression 11, which can, for example, take the form of a groove, is provided in the projection 10. Depression 11 can have a width b and a depth t. The width b of the depression 11 is preferably about one third of width a of the projection 10. Furthermore, depth t of the depression 11 is preferably less than the height h of the projection 10.

It is to be understood that two, three or more depressions can also be provided on projection 10 without deviating from the scope of the invention. Between the depressions, there can be an elevation (not shown), that can be level with the areas of the projection arranged outside the groove, or alternatively the elevation can be more or less elevated. The collective width of the depressions can be between about 10% and 90%, preferably between about 25% to 50%, or more preferably about 30% to 35% of width a of projection 10.

FIG. 2b shows one possible situation after the application of ultrasound. By applying ultrasound to the upper end 4, the material of the layer 7a, 7b melts, especially proximate projection 10 not having depression 11. For example, there is greater pressure being asserted on the side foil sheets 3a, 3b between the ultrasonic hammer 9 and the anvil 8 proximate projection 10 without depression 11 than proximate depression 11. Therefore, there is preferably more pressure between the foil material and the ultrasonic hammer 9, thus facilitating the injection of ultrasound injected into the foil material and, providing local heating of the clamped portions of the foil sheets 3a, 3b. As a result of the pressure between the anvil 8 and the ultrasonic hammer 9 on the foil sheets 3a, 3b, the melted material flows out of this area (weld zone 12, 13) and forms sealing wedges in the areas 14a, 14b, 14c, 14d. These sealing wedges adhere the two side foil sheets 3a, 3b together. Preferably, layers 6a, 6b are not themselves melted by the ultrasound. They do, however, hold the melted material of the layers 7a, 7b together and allow the melted material of layers 7a, 7b to form a unitary layer between layers 6a and 6b, preferably parallel to the surface of the ultrasonic hammer and/or the anvil. The layers 6a, 6b preferably also prevent foils 3a, 3b from sticking to the anvil 8 or the ultrasonic hammer 9.

As a result of the formation of four sealing wedges in the foil bag, all four wedges preferably extending along the weld seam 2, particularly good sealing of this weld seam 2 and thus the foil bag 1 can be achieved.

In the event of multiple depressions, it is also possible to create more sealing wedges or weld zones in the foil bag, allowing even better sealing of the weld seam and thus the foil bag 1.

The sealing wedges in the areas 14b and 14c can also be brought into contact with each other by means of a smaller depth t or width b of the depression 11, wherein sealing wedges 14b and 14c can merge into a single sealing wedge. For example, if the depression 11 provides little room for the displaced melted material, the melted material will likely fill in the area of the depression 11 until it is entirely filled. This can lead to a particularly strong adhering effect between the unmelted areas of the side wall foils 3a, 3b. This also applies in a corresponding manner for the case of multiple depressions 10.

FIG. 3 shows one embodiment of an anvil 8 having a support. On the side of the anvil 8 facing the ultrasound source, the projection 10 with the depression 11 is shown. It is to be understood that projection 10 may have one depression 10, as shown, or multiple depressions, preferably running parallel to one another.

The anvil 8 is preferably mounted to swiveling elements 16, wherein the swivel axis 15 runs parallel to the projection 10.

Whereas FIG. 3 shows projection 10 extending along the entire length of the anvil 8, projection 10 need not extend along the entire length of anvil 8, and can extend only a portion, or multiple portions of anvil 8, without deviating from the scope of the invention.

As shown, elements 16 themselves can be connected to an element 17, which is rotatably mounted to another element (not shown). The axis of rotation 14 around which the element 17 can be rotated is preferably substantially perpendicular to the axis of rotation 15.

Therefore, in accordance with the embodiment illustrated in FIG. 3, anvil 8 can be tipped with a slight mechanical effort around both the axis 14 and the axis 15.

Preferably, anvil 8 is urged toward ultrasonic hammer 9 by spring elements 18, 19. These can act directly on the anvil 8. In accordance with one embodiment of the invention, elements 16, 17 are urged with springs or other pressure elements. In accordance with a preferred embodiment, anvil 8 is urged with the two springs 18, 19, which apply pressure on the ends of the anvil 8.

The swiveling of the anvil 8 around the swivel axis 15 is preferably restricted in the direction toward the ultrasonic hammer 9. Therefore, by separating the anvil 8 from the ultrasonic hammer 9, a gap can be created between anvil 8 and ultrasonic hammer 9, into which a foil bag 1 can be introduced. Once the anvil 8 and the ultrasonic hammer 9 are brought together again, the foil bag 1 is preferably clamped between them. By means of bringing them somewhat closer together, the anvil 8 is preferably tipped around the swivel axis 15 to the left in FIG. 3, but is also simultaneously urged toward the ultrasonic hammer 9 by the springs 18, 19, thus applying pressure on the clamped portion of the foil bag 1. In this way, the necessary pressure can be created between the anvil 8 and the ultrasonic hammer 9, which preferably guarantees good injection of ultrasonic waves 7 into the material of the foil bag 1 to produce one or more weld seams and seal the foil bag 1. In the position in which the weld seam is produced, the anvil 8 is preferably perpendicular (see FIG. 2) or slightly tilted to the left at its upper end.

Above the ultrasonic hammer 9, it is also possible to provide a spring clip, for example, of spring steel, with which the end 4 of the foil bag 1 that stands out over the projection 10 can be pressed against the anvil 8, thus fixing the bag in place between the anvil 8 and the ultrasonic hammer 9 for clamping. In this process, the spring clip is preferably kept in a fixed relation to the ultrasonic hammer 9. The spring clip can press the upper end 4 of the foil bag 1 against the level surface, shown above the projection 10 in FIG. 3, of the anvil 8.

Providing for tipping of the anvil 8 around the axis 14, it may compensate for slight imprecision in the support of the anvil 8 or the ultrasonic hammer 9, or the foil thicknesses of the side foil sheets 3a, 3b. These deviations may cause uneven distribution of ultrasound waves or pressure. By permitting anvil 8 to tilt, the effect of such deviations may be lessened and even ultrasound wave or pressure distribution may be obtained notwithstanding such imperfections and proper sealing of the foil sheets 3a, 3b can be obtained. Therefore, the pressure that is generated by the spring elements 18, 19 can preferably be uniformly distributed across the entire width of the anvil 8 or along the weld seam 2. This can be advantageous for the uniform formation of the weld seam 2 and uniform sealing of the foil sheets 3a, 3b.

It can be advantageous to arrange a plurality of apparatuses in accordance with the invention in a row, thereby making it possible to weld several foil bags 1 next to one another simultaneously with the same holders and with the same means of conveyance.

Preferably, a single anvil 8, mounted in such a way that it can be tipped, is provided for each foil bag 1. However, it is also possible to provide one anvil 8 for two or more foil bags.

The examples provided are merely exemplary, as a matter of application specific to design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, the foil sheets being welded together can be loose sheets or sides of a preformed foil bag, or can be a single sheet being welded to itself, etc., without deviating from the scope of the invention as a matter of application specific to design choice. Additionally, other alterations are encompassed by the invention, as a way of non-limiting example, a press that is independent from the ultrasound source, a weld seam being formed from more than two foil sheets, etc., as a matter of application specific to design choice. Furthermore, weld seams illustrated in the embodiments described herein span the length of the foil sheets positioned between. However, the weld seams can be shorter, there can be multiple shorter weld seams along a single line rather than one long, single weld seam, etc., without deviating from the scope of the invention as a matter of application specific to design choice. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

We claim:

1. An apparatus for producing one or more weld seams on a foil bag, comprising:
an ultrasonic source; and
a press including an anvil having a weld side facing the ultrasonic source with a projection having a height and a width, the projection having at least one depression with a depth and a width, the press being constructed and arranged so that a portion of the foil bag is clamped between the projection and the ultrasonic source to provide a pressure on at least a part of one or more foil sheets of the foil bag proximate the ultrasonic source to create the one or more weld seams on the foil bag,
wherein the depth of the at least one depression is less than height of the projection and the width of the at least one depression is approximately 20%-50% the width of the projection and the at least one depression is substantially filled by a melted material when the one or more weld seam is created; and wherein the anvil is constructed and arranged such that it is capable of moving toward the ultrasonic source to clamp the foil bag such that the one or more weld seam is produced with a single movement of the anvil.

2. The apparatus according to claim 1, wherein the anvil can be tipped.

3. The apparatus according to claim 1, wherein the anvil can be tipped around at least two axes.

4. The apparatus according to claim 1, wherein at least two pressure elements urge the anvil toward the ultrasonic source.

5. The apparatus according to claim 4, wherein the anvil has two ends, and the two pressure elements are proximate the ends of the anvil.

6. The apparatus according to claim 1, comprising a spring clip which exerts a pressure toward the anvil against the foil bag.

7. The apparatus according to claim 1, wherein the projection comprises a plurality of depressions having a collective width that is less than the projection width.

8. The apparatus of claim 1, wherein the press comprises the ultrasound source and an anvil constructed and arranged to exert pressure toward each other.

9. The apparatus according to claim 1, wherein the width of the at least one depression is approximately 30-35% of the projection width.

10. The apparatus according to claim 7, wherein the collective width is approximately 25-50% of the projection width.

11. The apparatus according to claim 7, wherein the collective width is approximately 30-35% of the projection width.

12. The apparatus according to claim 1, wherein the weld seams are created on an open end of the foil bag.

13. An assembly for producing weld seams on foil bags, comprising a plurality of apparatuses in accordance with claim 1, wherein the plurality of apparatus are aligned and can be activated synchronously.

14. An apparatus for producing a weld seam on a foil bag comprising:

a press for clamping a portion of the foil bag, the press comprising an anvil and an ultrasound source for providing ultrasound waves to the foil bag so that when the foil bag is pressed between the ultrasound source and the anvil, weld seams on the portion of the foil bag are created, wherein the anvil includes a weld side having one or more projections having a width and height facing the ultrasonic source, the one or more projections having at least one depression having a width approximately 20%-50% the width of the one or more projections, a depth that is less than height of the one or more projections, and dimensioned to be substantially filled with a melted material when the weld seam is produced; and wherein the anvil is constructed and arranged such that it is capable of moving toward the ultrasonic source to clamp the foil bag such that the weld seams is produced with a single movement of the anvil.

15. The apparatus of claim 14, wherein weld seams created by the press seal the foil bag.

16. An apparatus for creating a weld seam on a foil bag comprising:

a press including:

a first press member;

an anvil for clamping a foil bag between the press and the anvil, the anvil having a weld side having one or more projections having a width and a height, the one or more projections having a depression having a width approximately 20%-50% the width of the one or more projections and a depth less than the height of the one or more projections and dimensioned to be substantially filled with a melted material when the weld seam is created; and an ultrasonic source for providing ultrasound waves to the foil bag to create the weld seam when at least a portion of the foil bag is pressed between the first press member and the anvil, wherein the anvil is constructed and arranged such that it is capable of moving toward the ultrasonic source to clamp the foil bag such that the weld seam is produced with a single movement of the anvil.

\* \* \* \* \*

UNITED STATES PATENT AND TRADEMARK OFFICE
CERTIFICATE OF CORRECTION

PATENT NO. : 7,958,924 B2  
APPLICATION NO. : 11/490401  
DATED : June 14, 2011  
INVENTOR(S) : Hans-Peter Wild et al.

It is certified that error appears in the above-identified patent and that said Letters Patent is hereby corrected as shown below:

Title Page:
Change the following:

"(73)   Assignee: INDAG Gesellschaft für Industrisbedarf mbH & Co. Betriebs KG, Eppelheim (DE)"

to

--(73)   Assignee: INDAG Gesellschaft für Industriebedarf mbH & Co. Betriebs KG, Eppelheim (DE)--.

Signed and Sealed this  
Twenty-seventh Day of March, 2012

David J. Kappos  
*Director of the United States Patent and Trademark Office*